United States Patent
Tsuji et al.

(10) Patent No.: US 11,214,651 B2
(45) Date of Patent: Jan. 4, 2022

(54) THERMALLY CONDUCTIVE SILICONE COMPOSITION

(71) Applicant: Shin-Etsu Chemical Co., Ltd., Tokyo (JP)

(72) Inventors: Kenichi Tsuji, Annaka (JP); Mitsuhiro Iwata, Annaka (JP); Shota Akiba, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 526 days.

(21) Appl. No.: 16/322,629

(22) PCT Filed: Jun. 12, 2017

(86) PCT No.: PCT/JP2017/021615
§ 371 (c)(1),
(2) Date: Feb. 1, 2019

(87) PCT Pub. No.: WO2018/025502
PCT Pub. Date: Feb. 8, 2018

(65) Prior Publication Data
US 2021/0324148 A1 Oct. 21, 2021

(30) Foreign Application Priority Data
Aug. 3, 2016 (JP) .............................. JP2016-152759

(51) Int. Cl.
| C08G 77/14 | (2006.01) |
| C08G 77/08 | (2006.01) |
| C08K 3/08 | (2006.01) |
| B01J 31/22 | (2006.01) |

(52) U.S. Cl.
CPC ............. *C08G 77/14* (2013.01); *C08G 77/08* (2013.01); *C08K 3/08* (2013.01); *B01J 31/2295* (2013.01); *C08K 2003/0806* (2013.01); *C08K 2201/001* (2013.01)

(58) Field of Classification Search
CPC ........ C08G 77/18; C08G 77/12; C08G 77/20; C08L 83/04; C08K 2201/001; B01J 23/40
See application file for complete search history.

(56) References Cited

U.S. PATENT DOCUMENTS

| 4,916,169 | A | 4/1990 | Boardman et al. |
| 6,376,569 | B1 | 4/2002 | Oxman et al. |
| 6,940,722 | B2 | 9/2005 | Tetsuka et al. |
| 2005/0084691 | A1 | 4/2005 | Endo et al. |
| 2007/0160936 | A1* | 7/2007 | Gardner ............ H01L 25/50 430/311 |
| 2013/0072592 | A1 | 3/2013 | Inafuku et al. |
| 2013/0105726 | A1 | 5/2013 | Tsuji et al. |
| 2015/0001439 | A1 | 1/2015 | Tsuji et al. |

FOREIGN PATENT DOCUMENTS

| CN | 101412851 A | 4/2009 |
| CN | 103073894 A | 5/2013 |
| CN | 10387277 A | 5/2014 |
| EP | 0 939 115 A1 | 9/1999 |
| EP | 3 199 591 A1 | 8/2017 |
| JP | 2-107668 A | 4/1990 |
| JP | 6-503591 A | 4/1994 |
| JP | 7-207160 A | 8/1995 |
| JP | 2938428 B1 | 8/1999 |
| JP | 2938429 B1 | 8/1999 |
| JP | 3928943 B2 | 6/2007 |
| JP | 3952184 B2 | 8/2007 |
| JP | 4551074 B2 | 9/2010 |
| JP | 5648619 B2 | 1/2015 |
| WO | WO 2016/047219 A1 | 3/2016 |

OTHER PUBLICATIONS

Office Action dated Oct. 15, 2020, in Taiwan Patent Application No. 106121639.
International Search Report (PCT/ISA/210) issued in PCT/JP2017/021615, dated Sep. 12, 2017.
Written Opinion (PCT/ISA/237) issued in PCT/JP2017/021615, dated Sep. 12, 2017.
Chinese Office Action and Search Report for Chinese Appfcation No. 201780048112.6, dated Feb. 19, 2021.

* cited by examiner

*Primary Examiner* — Kuo Liang Peng
(74) *Attorney, Agent, or Firm* — Birch, Stewart, Kolasch & Birch, LLP

(57) ABSTRACT

With respect to an addition-curable thermally conductive silicone composition in which a silver filler is blended, a catalyst having a specific structure and an organohydrogen polysiloxane having a specific structure are used for the purpose of extending the working life at room temperature, while maintaining the flexibility, so that a thermally conductive silicone composition which is able to have a good balance between flexibility after curing and storage stability in one pack, while having extremely low thermal resistance and excellent reliability is achieved.

5 Claims, 1 Drawing Sheet

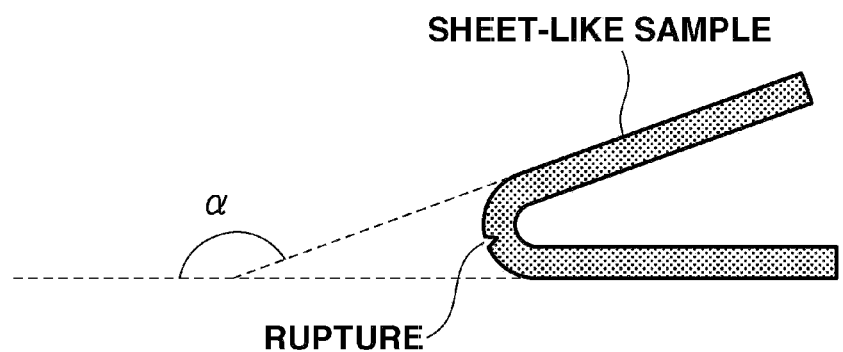

THERMALLY CONDUCTIVE SILICONE COMPOSITION

TECHNICAL FIELD

This invention relates to a heat-conductive silicone composition having a very low thermal resistance and excellent reliability.

BACKGROUND ART

It is widely known that semiconductor devices generate heat during operation.

Since the temperature rise of semiconductor devices invites a decline of performance, cooling of the devices is necessary. Generally, a cooling member (e.g., heat sink) is placed near the heat-generating member for cooling. If the contact between the heat-generating member and the cooling member is loose, air intervenes between the two members to detract from the cooling efficiency. Therefore, heat-dissipating grease, sheets and the like are used for the purpose of improving the adhesion between the heat-generating member and the cooling member (Patent Document 1: JP 2938428, Patent Document 2: JP 2938429, and Patent Document 3: JP 3952184).

With regard to semiconductor devices for higher grade equipment such as servers, the amount of heat generated during operation is increasing in recent years. As the amount of heat generated increases, the heat-dissipating greases and sheets must display better heat-dissipating performance. Such an improvement in heat-dissipating performance is achieved by reducing the thermal resistance of heat-dissipating greases and sheets. The method for reducing thermal resistance is broadly classified into two methods, a method of increasing the thermal conductivity of the material and a method of reducing the thermal contact resistance. Heretofore, Patent Document 4: JP 3928943 and Patent Document 5: JP 4551074 describe the method of reducing the thermal contact resistance by preparing a heat-dissipating grease having blended therein a metal with a low melting point and heating the grease for curing, whereby the low-melting metal is melted to achieve tighter adhesion to the substrate.

Although the thermal contact resistance can be reduced, the low-melting metal itself has a low thermal conductivity, leaving the problem that the thermal resistance of the overall composition is not so reduced.

It is also contemplated from the same point of view to use a solder containing a metal having a high thermal conductivity. However, the solder itself has a low thermal conductivity and accordingly, the composition still has a low thermal conductivity (Patent Document 6: JP-A H07-207160).

PRIOR ART DOCUMENTS

Patent Documents

Patent Document 1: JP 2938428
Patent Document 2: JP 2938429
Patent Document 3: JP 3952184
Patent Document 4: JP 3928943
Patent Document 5: JP 4551074
Patent Document 6: JP-A H07-207160
Patent Document 7: JP 5648619

SUMMARY OF INVENTION

Technical Problem

An object of the invention, which has been made under the above-mentioned circumstances, is to provide a heat-conductive silicone composition having a very low thermal resistance and excellent reliability.

Solution to Problem

The inventors previously found (in Patent Document 7: JP 5648619) that the thermal resistance of a composition is reduced by incorporating fusible silver therein. However, the composition is difficult to exhibit flexibility after curing which is necessary for improving reliability. An attempt to increase the amount of a catalyst to form a crosslink structure with the aim of maintaining flexibility encounters the problem that the pot life is extremely short.

Making further investigations on an addition-curable heat-conductive silicone composition comprising a silver filler, the inventors have found that when a catalyst of specific structure and an organohydrogenpolysiloxane of specific structure are used in order to prolong the pot life at normal temperature while maintaining flexibility, the resulting heat-conductive silicone composition meets both flexibility after curing and shelf stability in one-part form despite the use of the silver filler having excellent thermal properties and has a very low thermal resistance and improved reliability. The invention is predicated on this finding.

Accordingly, the invention provides a heat-conductive silicone composition as defined below.

[1] A heat-conductive silicone composition comprising the following components (A) to (D):

(A) 100 parts by weight of an organopolysiloxane containing at least two alkenyl groups per molecule and having a kinematic viscosity of 10 to 100,000 mm$^2$/s at 25° C., (B) an organohydrogenpolysiloxane containing at least two silicon-bonded hydrogen atoms (i.e., Si—H groups) per molecule and free of molecular end Si—H groups, in such an amount that the number of Si—H groups in component (B) divided by the number of alkenyl groups in component (A) falls in the range from 1.5 to 2.5, (C) a platinum complex curing catalyst selected from the group consisting of trimethyl(acetylacetonato)platinum complex, trimethyl(2,4-pentanedionato)platinum complex, trimethyl(3,5-heptanedionato)platinum complex, trimethyl(methylacetoacetato)platinum complex, bis(2,4-pentanedionato)platinum complex, bis(2,4-hexanedionato)platinum complex, bis(2,4-heptanedionato)platinum complex, bis(3,5-heptanedionato)platinum complex, bis(1-phenyl-1,3-butanedionato)platinum complex, bis(1,3-diphenyl-1,3-propanedionato)platinum complex, (1,5-cyclooctadienyl)dimethyl platinum complex, (1,5-cyclooctadienyl)diphenyl platinum complex, (1,5-cyclooctadienyl)dipropyl platinum complex, (2,5-norbornadiene)dimethyl platinum complex, (2,5-norbornadiene)diphenyl platinum complex, (cyclopentadienyl)dimethyl platinum complex, (methylcyclopentadienyl)diethyl platinum complex, (trimethylsilylcyclopentadienyl)diphenyl platinum complex, (methylcycloocta-1,5-dienyl)diethyl platinum complex, (cyclopentadienyl)trimethyl platinum complex, (cyclopentadienyl)ethyldimethyl platinum complex, (cyclopentadienyl)acetyldimethyl platinum complex, (methylcyclopentadienyl)trimethyl platinum complex, (methylcyclopentadienyl)trihexyl platinum complex, (trimethylsilylcyclopentadienyl)trimethyl platinum complex, (dimethylphenylsilylcyclopentadienyl)triphenyl platinum complex, and (cyclopentadienyl)dimethyltrimethylsilylmethyl platinum complex, in such an amount as to give 500 to 10,000 ppm of platinum atom based on the weight of component (A), and (D) 500 to 3,000 parts by weight of silver powder.

[2] The heat-conductive silicone composition of [1], further comprising (E) a heat-conductive filler having a thermal conductivity of at least 10 W/m° C. other than component (D), in an amount of 1 to 300 parts by weight per 100 parts by weight of component (A).

[3] The heat-conductive silicone composition of [1] or [2], further comprising (F) an inhibitor selected from acetylene compounds, nitrogen compounds, organic phosphorus compounds, oxime compounds, and organic chlorine compounds, in an amount of 0.05 to 0.5 part by weight per 100 parts by weight of component (A).

[4] The heat-conductive silicone composition of any one of [1] to [3], further comprising (G) an organosilane having the general formula (1):

wherein $R^1$ is a $C_9$-$C_{15}$ alkyl group, $R^2$ is a $C_1$-$C_{10}$ monovalent hydrocarbon group, $R^3$ is at least one $C_1$-$C_6$ alkyl group, a is an integer of 1 to 3, b is 0, 1 or 2, and a+b is an integer of 1 to 3, in an amount of 1 to 10 parts by weight per 100 parts by weight of component (A).

[5] The heat-conductive silicone composition of any one of [1] to [4], further comprising (H) a one end trifunctional hydrolyzable methylpolysiloxane having the general formula (2):

[Chem. 1]

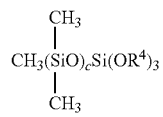

(2)

wherein $R^4$ is a $C_1$-$C_6$ alkyl group and c is an integer of 5 to 100, in an amount of 1 to 10 parts by weight per 100 parts by weight of component (A).

Advantageous Effects of Invention

Due to a proper choice of the catalyst and crosslinker, the heat-conductive silicone composition of the invention meets both flexibility after curing and shelf stability in one-part form despite the use of a silver filler having excellent thermal properties.

BRIEF DESCRIPTION OF DRAWING

FIG. 1 is a schematic view for illustrating a site of flexibility measurement in Examples.

DESCRIPTION OF EMBODIMENTS

Now the invention is described in detail.

The invention is directed to a heat-conductive silicone composition comprising the following components:

(A) an organopolysiloxane containing at least two alkenyl groups per molecule and having a kinematic viscosity of 10 to 100,000 mm²/s at 25° C., (B) an organohydrogenpolysiloxane containing at least two silicon-bonded hydrogen atoms per molecule and free of molecular end silicon-bonded hydrogen atoms, (C) a specific platinum complex curing catalyst as listed below, and (D) silver powder.

The organopolysiloxane as component (A) of the present composition contains at least two silicon-bonded alkenyl groups, preferably 2 to 5 silicon-bonded alkenyl groups per molecule. The organopolysiloxane may be linear or branched or a mixture of two or more.

Examples of the silicon-bonded alkenyl group include vinyl, allyl, 1-butenyl, and 1-hexenyl. Of these, vinyl is preferred for ease of synthesis and cost.

The alkenyl group may be present at the end and/or a midway position of the molecular chain of the organopolysiloxane. Preferably the alkenyl group is attached at least to the end of the molecular chain.

The remaining silicon-bonded organic groups include monovalent hydrocarbon groups of 1 to 12 carbon atoms, preferably 1 to 8 carbon atoms. Examples of the monovalent hydrocarbon group include alkyl groups such as methyl, ethyl, propyl, butyl, hexyl and dodecyl, aryl groups such as phenyl, aralkyl groups such as 2-phenylethyl and 2-phenylpropyl, and substituted monovalent hydrocarbon groups in which one or more or even all hydrogen atoms are substituted by halogen atoms or the like, such as chloromethyl and 3,3,3-trifluoropropyl. Of these, methyl is preferred for ease of synthesis and cost.

The organopolysiloxane as component (A) has a kinematic viscosity at 25° C. in the range of 10 to 100,000 mm²/s, preferably in the range of 100 to 50,000 mm²/s. If the viscosity is less than 10 mm²/s, the composition has poor storage stability. If the viscosity exceeds 100,000 mm²/s, the resulting composition loses extensibility. Notably, the viscosity is measured by an Ostwald viscometer (the same applies hereinafter).

Component (B) is an organohydrogenpolysiloxane containing silicon-bonded hydrogen atoms (i.e., Si—H groups). The organohydrogenpolysiloxane must have at least two, preferably 2 to 20 Si—H groups per molecule for ensuring that the composition forms a network structure through crosslinking.

The organohydrogenpolysiloxane used herein has a structure free of Si—H groups at the molecular end because the Si—H group at the molecule end adversely affects the shelf stability at normal temperature.

The remaining silicon-bonded organic groups include monovalent hydrocarbon groups free of aliphatic unsaturation of 1 to 12 carbon atoms, preferably 1 to 8 carbon atoms. Examples of the monovalent hydrocarbon group include alkyl groups such as methyl, ethyl, propyl, butyl, hexyl and dodecyl, aryl groups such as phenyl, aralkyl groups such as 2-phenylethyl and 2-phenylpropyl, halogenated monovalent hydrocarbon groups in which one or more or even all hydrogen atoms are substituted by halogen atoms, such as chloromethyl and 3,3,3-trifluoropropyl, and epoxy ring-containing organic groups such as 2-glycidoxyethyl, 3-glycidoxypropyl and 4-glycidoxybutyl.

The organohydrogenpolysiloxane having Si—H groups may be linear, branched or cyclic or a mixture thereof.

The organohydrogenpolysiloxane having Si—H groups preferably has a degree of polymerization of 10 to 100, more preferably 10 to 60. Notably, the degree of polymerization may be measured versus polystyrene standards by gel permeation chromatography (GPC) analysis using toluene, tetrahydrofuran (THF) or another solvent as developing solvent, and the average degree of polymerization is typically determined as a number average degree of polymerization (the same applies hereinafter).

Component (B) is used in such an amount that a ratio of the number of Si—H groups in component (B) to the number of alkenyl groups in component (A), that is, {number of Si—H groups in component (B)}/{number of alkenyl groups in component (A)} ranges from 1.5 to 2.5, preferably from 1.6 to 2.3. A ratio of less than 1.5 is unfavorable from the aspect of material reliability because the composition cures short, failing to form a a sufficient network structure. If the ratio exceeds 2.5, the cured material becomes too hard and is not flexible.

Component (C) is a platinum complex curing catalyst which is normally activated upon UV irradiation, but can promote heat curing in the present composition. Component (C) exerts a catalytic action to promote addition reaction of components (A) and (B) while maintaining the shelf stability of the composition at normal temperature.

The compound used as the platinum complex curing catalyst (C) is a β-diketone platinum complex or a platinum complex having a cyclic diene compound as ligand.

Examples of the (3-diketone platinum complex include trimethyl(acetylacetonato)platinum complex, trimethyl(2,4-pentanedionato)platinum complex, trimethyl(3,5-heptanedionato)platinum complex, trimethyl(methylacetoacetato) platinum complex, bis(2,4-pentanedionato)platinum complex, bis(2,4-hexanedionato)platinum complex, bis(2,4-heptanedionato)platinum complex, bis(3,5-heptanedionato) platinum complex, bis(1-phenyl-1,3-butanedionato)platinum complex, and bis(1,3-diphenyl-1,3-propanedionato) platinum complex.

Examples of the platinum complex having a cyclic diene compound as ligand include (1,5-cyclooctadienyl)dimethyl platinum complex, (1,5-cyclooctadienyl)diphenyl platinum complex, (1,5-cyclooctadienyl)dipropyl platinum complex, (2,5-norbornadiene)dimethyl platinum complex, (2,5-norbornadiene)diphenyl platinum complex, (cyclopentadienyl) dimethyl platinum complex, (methylcyclopentadienyl)diethyl platinum complex, (trimethylsilylcyclopentadienyl) diphenyl platinum complex, (methylcycloocta-1,5-dienyl) diethyl platinum complex, (cyclopentadienyl)trimethyl platinum complex, (cyclopentadienyl)ethyldimethyl platinum complex, (cyclopentadienyl)acetyldimethyl platinum complex, (methylcyclopentadienyl)trimethyl platinum complex, (methylcyclopentadienyl)trihexyl platinum complex, (trimethylsilylcyclopentadienyl)trimethyl platinum complex, (dimethylphenylsilylcyclopentadienyl)triphenyl platinum complex, and (cyclopentadienyl)dimethyltrimethylsilylmethyl platinum complex.

Component (C) is used in such an amount as to give 500 to 10,000 ppm, preferably 500 to 8,000 ppm of platinum atom based on the weight of component (A). In an amount of less than 500 ppm, the heat cured product becomes brittle. In an amount of more than 10,000 ppm, the shelf stability at normal temperature is reduced.

Component (D) is silver powder, which may have any shape such as irregular, spherical or scaly or be a mixture of two or more shapes.

Component (D) preferably has an average particle size in the range of 0.1 to 100 μm, more preferably 0.1 to 50 μm. If the average particle size is less than 0.1 μm, the resulting composition may not become greasy and lose extensibility. With an average particle size in excess of 100 μm, the heat-dissipating grease may lose uniformity. As used herein, the average particle size is a volume basis accumulative average particle size as measured by Microtrac MT3300EX (Nikkiso Co., Ltd.) (the same applies hereinafter).

The amount of component (D) loaded is in a range of 500 to 3,000 parts, preferably 500 to 2,800 parts by weight per 100 parts by weight of component (A). If the amount is less than 500 parts, the cured product loses thermal conductivity. If the amount is more than 3,000 parts, the composition builds up its viscosity and thus loses extensibility.

If necessary, the heat-conductive silicone composition may further comprise (E) a heat-conductive filler having a thermal conductivity of at least 10 W/m° C. other than component (D), (F) a specific inhibitor, (G) an organosilane having the formula (1) to be described later, and (H) a one end trifunctional hydrolyzable methylpolysiloxane having the formula (2) to be described later.

Component (E) is a heat-conductive filler having a thermal conductivity of at least 10 W/m° C. other than component (D). If the thermal conductivity of the filler is less than 10 W/m° C., the heat-conductive silicone composition itself has a low thermal conductivity.

Suitable heat-conductive fillers include aluminum powder, copper powder, iron powder, nickel powder, gold powder, tin powder, metal silicide powder, aluminum nitride powder, boron nitride powder, alumina powder, diamond powder, carbon powder, indium powder, gallium powder, and zinc oxide powder, but are not limited thereto. Any desired filler may be used as long as the thermal conductivity is 10 W/m° C. or higher.

Also, the filler may be used alone or in admixture of two or more.

The shape of component (E) may be irregular, spherical or otherwise.

Component (E) preferably has an average particle size in the range of 0.1 to 100 μm, more preferably 0.1 to 80 μm. If the average particle size is less than 0.1 μm, the resulting composition may not become greasy and lose extensibility. With an average particle size in excess of 100 μm, the resulting composition may lose uniformity.

The amount of component (E) loaded is preferably in a range of 0 to 300 parts, more preferably 0 to 200 parts, and even more preferably 0 to 180 parts by weight per 100 parts by weight of component (A). When compounded, the amount of component (E) is preferably at least 1 part by weight. If the amount of component (E) loaded is too much, the composition may have too high a viscosity to work.

Notably, component (E) is preferably used in an amount of 1 to 8% by weight of component (D).

Component (F) is an inhibitor which serves to suppress the progress of hydrosilylation reaction at room temperature for thereby prolonging the shelf life and pot life. Any well-known reaction inhibitors may be used. In the practice of the invention, a reaction inhibitor selected from acetylene compounds such as 1-ethynyl-1-cyclohexanol and 3,5-dimethyl-1-hexyn-3-ol, nitrogen compounds such as tributylamine, tetramethylethylenediamine and benzotriazole, organic phosphorus compounds such as triphenylphosphine, oxime compounds, and organic chlorine compounds may be used for the purpose of suppressing the catalytic activity of component (C).

The amount of component (F) used is preferably in a range of 0.05 to 0.5 part, more preferably 0.05 to 0.4 part by weight per 100 parts by weight of component (A). If the amount of component (F) is less than 0.05 part by weight, the shelf life may be insufficient. If the amount exceeds 0.5 part by weight, the cured product may have less flexibility.

Component (F) may be diluted with a solvent such as toluene, prior to use, in order to facilitate its dispersion in the silicone composition.

Component (G) is an organosilane having the general formula (1), which serves as a wetter.

$$R^1{}_aR^2{}_bSi(OR^3)_{4-a-b} \quad (1)$$

Herein $R^1$ is a $C_9$-$C_{15}$ alkyl group, $R^2$ is a $C_1$-$C_{10}$ monovalent hydrocarbon group, $R^3$ is at least one group selected from $C_1$-$C_6$ alkyl groups, a is an integer of 1 to 3, b is 0, 1 or 2, and a+b is an integer of 1 to 3.

In formula (1), $R^1$ is a $C_9$-$C_{15}$ alkyl group, examples of which include nonyl, decyl, dodecyl, and tetradecyl. If the carbon count is less than 9, the wettability to fillers is insufficient. If the carbon count is more than 15, the organosilane solidifies at normal temperature and becomes awkward to handle and the resulting composition loses low-temperature properties.

The subscript a is 1, 2 or 3, preferably 1.

$R^2$ is a saturated or unsaturated monovalent hydrocarbon group of 1 to 10 carbon atoms, preferably 1 to 8 carbon atoms, examples of which include alkyl, cycloalkyl, alkenyl, aryl, and aralkyl groups. Suitable groups include alkyl groups such as methyl, ethyl, propyl, hexyl and octyl, cycloalkyl groups such as cyclopentyl and cyclohexyl, alkenyl groups such as vinyl and allyl, aryl groups such as phenyl and tolyl, aralkyl groups such as 2-phenylethyl and 2-methyl-2-phenylethyl, and halogenated monovalent hydrocarbon groups in which one or more or even all hydrogen atoms are substituted by halogen atoms (e.g., fluorine), such as 3,3,3-trifluoropropyl, 2-(perfluorobutyl)ethyl, 2-(perfluorooctyl)ethyl and p-chlorophenyl. Inter alia, methyl and ethyl are preferred.

The subscript b is 0, 1 or 2, preferably 0 or 1 and a+b is 1, 2 or 3, preferably 1 or 2.

$R^3$ is one or more groups selected from $C_1$-$C_6$ alkyl groups such as methyl, ethyl, propyl, butyl, pentyl and hexyl, with methyl and ethyl being preferred.

Illustrative examples of the organosilane of formula (1) are given below.

$$C_{10}H_{21}Si(OCH_3)_3$$

$$C_{12}H_{25}Si(OCH_3)_3$$

$$C_{12}H_{25}Si(OC_2H_5)_3$$

$$C_{10}H_{21}Si(CH_3)(Si(CH_3)(OCH_3)_2$$

$$C_{10}H_{21}Si(C_6H_5)(OCH_3)_2$$

$$C_{10}H_{21}Si(CH_3)(OC_2H_5)_2$$

$$C_{10}H_{21}Si(CH=CH_2)(OCH_3)_2$$

$$C_{10}H_{21}Si(CH_2CH_2CF_3)(OCH_3)_2$$

The amount of component (G) used is preferably in a range of 0 to 10 parts, more preferably 0 to 8 parts by weight per 100 parts by weight of component (A). When added, the amount of the organosilane (G) is preferably at least 1 part by weight. If component (G) is too much, voids may form in the material upon heating.

Component (H) is a one end trifunctional hydrolyzable methylpolysiloxane having the general formula (2).

[Chem. 2]

$$\begin{array}{c} CH_3 \\ | \\ CH_3(SiO)_cSi(OR^4)_3 \\ | \\ CH_3 \end{array} \quad (2)$$

Herein $R^4$ is a $C_1$-$C_6$ alkyl group and c is an integer of 5 to 100.

In formula (2), $R^4$ is a $C_1$-$C_6$ alkyl group, examples of which include methyl, ethyl, propyl, butyl, pentyl, and hexyl. Methyl is preferred.

The subscript c is preferably 5 to 100, more preferably 10 to 60. If c is less than 5, the composition suffers from noticeable oil bleeding, losing reliability. If c is more than 100, the wettability is insufficient.

The amount of the one end trifunctional hydrolyzable methylpolysiloxane added as component (H) is preferably in a range of 0 to 10 parts, more preferably 0 to 9 parts by weight per 100 parts by weight of component (A). When added, the amount of component (H) is preferably at least 1 part by weight. If component (H) is too much, the composition may experience oil separation during storage.

Also, besides components (A) to (H), optionally an adhesion promoter, an antioxidant for preventing degradation and other additives may be compounded in the heat-conductive silicone composition.

The heat-conductive silicone composition is prepared by mixing components (A) to (D), optionally components (E) to (H) and other components, on a mixer such as Trimix, Twinmix or Planetary Mixer (trade names of Inoue Mfg. Inc.), Ultra Mixer (trade name of Mizuho Industry Co., Ltd.) or Hivis Disper Mix (trade name of Tokushu Kika Kogyo Co., Ltd.).

The resulting heat-conductive silicone composition preferably has a viscosity at 25° C. of 10 to 500 Pa·s, more preferably 10 to 300 Pa·s. Notably, the viscosity is measured by a rotational viscometer.

The heat-conductive silicone composition is cured by heating at 100° C. to 200° C., specifically 100° C. to 180° C. for 10 to 120 minutes, specifically 10 to 90 minutes. The heat-conductive silicone composition may be cured while applying a pressure of 0.1 to 0.7 MPa.

The heat-conductive silicone composition thus obtained has good shelf stability in one-part form. The cured product is advantageously used as heat-dissipating members or heat sinks especially in servers, PCs, and IGBTs because it maintains flexibility and has very low thermal resistance and excellent reliability.

EXAMPLES

Examples and Comparative Examples are given below for illustrating the invention, but the invention is not limited thereto.

The effects of the inventive composition were tested as follows.

[Viscosity]

The absolute viscosity of the silicone composition was measured at 25° C. by a Malcom viscometer (type PC-1TL).

[Thermal Conductivity]

The silicone composition was cured at 150° C. for 90 minutes under a persistent pressure of 100 psi (0.7 MPa) into a cured product of 6 mm thick, which was measured for thermal conductivity at 25° C. by a quick thermal conductivity meter QTM-500 (Kyoto Electronics Mfg. Co., Ltd.).

[Thermal Resistance]

A test piece for thermal resistance measurement was prepared by sandwiching the silicone composition between two aluminum disks of diameter 12.7 mm and heating at 150° C. for 90 minutes under a pressure of 0.71\4 Pa. The test piece was measured for thermal resistance by NanoFlash (LFA 447 by NETZSCH).

[Flexibility]

The silicone composition was heated at 150° C. for 90 minutes under a persistent pressure of 100 psi (0.7 MPa), forming a 6 cm square sheet-like sample of 2 mm thick.

When the sample was bent along the center line, the angle α shown in FIG. 1 at which the sample surface was ruptured was recorded. The larger the angle, the better is flexibility.

[Shelf stability]

The silicone composition, 200 g, was placed in a container and tested for shelf stability at 25° C. The composition was inspected every 24 hours (1 day) whether or not it cured, and the number of days taken until cure was determined. The longer the time duration until cure, the better is shelf stability.

The components in the composition are shown below.

Component (A)
  A-1: dimethylpolysiloxane blocked at both ends with dimethylvinylsilyl and having a viscosity of 600 min$^2$/s at 25° C.

Component (B)
  B-1: organohydrogenpolysiloxane of the following formula

[Chem. 3]

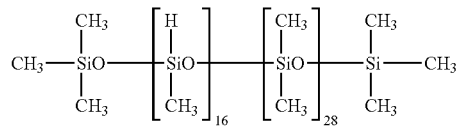

organohydrogenpolysiloxane of the following formula

[Chem. 4]

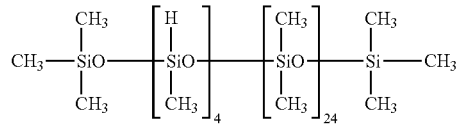

B-3: organohydrogenpolysiloxane of the following formula (for comparison)

[Chem. 5]

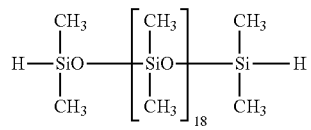

Component (C)
  C-1: solution of (methylcyclopentadienyl)trimethyl platinum complex in A-1 (platinum content: 5 wt %)
  C-2: solution of bis(1,3-diphenyl-1,3-propanedionato) platinum complex in A-1 (platinum content: 5 wt %)
  C-3: solution of platinum-divinyltetramethyldisiloxane complex in A-1 (platinum content: 5 wt %) (for comparison)

Component (D)
  D-1: silver powder with an average particle size of 7.5 μm

Component (E)
  E-1: aluminum powder with an average particle size of 10 μm

Component (F)
  F-1: 1-ethynyl-1-cyclohexanol

Component (G)
  G-1: silane of the following formula

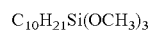

Component (H)
  H-1: polysiloxane of the following formula

[Chem. 6]

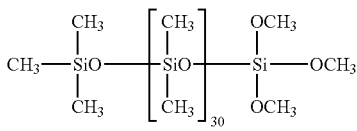

[Examples 1 to 7 and Comparative Examples 1 to 7]

Compositions of Examples 1 to 7 and Comparative Examples 1 to 7 were prepared by mixing the above components (A) to (H). Specifically, components (A), (B), (D), (E), (G) and (H) in the amounts shown in Tables 1 and 2 were fed into a 5-L Planetary Mixer (Inoue Mfg., Inc.) and mixed for 1 hour. Thereafter, components (C) and (F) in the amounts shown in Tables 1 and 2 were added thereto and mixed together. In Tables 1 and 2, the amounts of components are expressed in parts by weight (pbw).

TABLE 1

| Amount in composition | Example | | | | | | |
|---|---|---|---|---|---|---|---|
| (pbw) | 1 | 7 | 3 | 4 | 5 | 6 | 7 |
| A-1 | 99 | 100 | 100 | 100 | 100 | 100 | 100 |
| B-1 | 5.5 | 5.5 | 6.3 | 6.3 | | | |
| B-2 | | | | | 18.5 | 18.5 | 18.5 |
| B-3 (for comparison) | | | | | | | |
| C-1 | 1.3 | | 15 | | 3.5 | | 3.5 |
| C-2 | | 1.1 | | 13.5 | | 2.8 | |
| C-3 (for comparison) | | | | | | | |
| D-1 | 900 | 900 | 1,300 | 1,300 | 1,600 | 2,000 | 2,000 |
| E-1 | 60 | 60 | 60 | 60 | 0 | 60 | 60 |
| F-1 | 0.16 | 0.16 | 0.30 | 0.35 | 0.16 | 0.16 | 0.16 |
| G-1 | 0 | 0 | 0 | 0 | 0 | 5 | 0 |
| H-1 | 0 | 0 | 0 | 0 | 0 | 0 | 5 |
| S-H/Vi (molar ratio) | 2.0 | 2.0 | 2.0 | 2.0 | 2.2 | 2.2 | 2.2 |
| Platinum atom content (ppm) | 642 | 544 | 6,560 | 5,980 | 1,690 | 1,360 | 1,690 |
| Measurement results | | | | | | | |
| Viscosity (Pa-s) | 18 | 16 | 71 | 76 | 50 | 85 | 103 |
| Thermal conductivity (W/mK) | 11.9 | 12.6 | 37.1 | 39.2 | 20.1 | 35.1 | 28.5 |

TABLE 1-continued

| Amount in composition | Example | | | | | | |
|---|---|---|---|---|---|---|---|
| (pbw) | 1 | 7 | 3 | 4 | 5 | 6 | 7 |
| Thermal resistance (mm²-K/W) | 4.2 | 4.0 | 3.9 | 3.9 | 4.0 | 4.2 | 4.2 |
| Flexibility (°) | 69 | 81 | 102 | 116 | 93 | 98 | 76 |
| Shelf stability (day) | 18 | 16 | 6 | 5 | 11 | 8 | 7 |

TABLE 2

| Amount in composition | Comparative Example | | | | | | |
|---|---|---|---|---|---|---|---|
| (pbw) | 1 | 2 | 3 | 4 | 5 | 6 | 7 |
| A-1 | 100 | 100 | 100 | 100 | 100 | 100 | 100 |
| B-1 | 6.6 | 5.5 | 5.7 | 6.3 | 5.8 | | 5.7 |
| B-2 | | | | | | | |
| B-3 (for comparison) | | | | | | 22.3 | |
| C-1 | 25 | 0.9 | | 1.3 | | 1.3 | |
| C-2 | | | | | 2.8 | | |
| C-3 (for comparison) | | | 3.0 | | | | 0.03 |
| D-1 | 1,250 | 1,600 | 1,600 | 3,500 | 300 | 1,100 | 1,600 |
| E-1 | 60 | 60 | 60 | 60 | 180 | 60 | 60 |
| F-1 | 0.16 | 0.16 | 0.16 | 0.16 | 0.16 | 0.16 | 0.16 |
| G-1 | 0 | 0 | 0 | 0 | 0 | 0 | 0 |
| H-1 | 0 | 0 | 0 | 0 | 0 | 0 | 0 |
| S-H/Vi (molar ratio) | 2.0 | 2.0 | 2.0 | 2.0 | 7.1 | 2.0 | 2.0 |
| Platinum atom content (ppm) | 10,100 | 450 | 1,460 | 5980 | 1360 | 640 | 14.6 |
| Measurement results | | | | | | | |
| Viscosity (Pa·s) | 48 | 19 | 33 | not greasy | 10 | 16 | 35 |
| Thermal conductivity (W/mK) | 16.6 | 9.8 | 16.1 | | 3.6 | 9.3 | 8.5 |
| Thermal resistance (mm²-K/W) | 4.3 | 5.1 | 4.6 | | 9.1 | 4.8 | 6.3 |
| Flexibility (°) | 121 | 43 | 95 | | 123 | 89 | 32 |
| Shelf stability (day) | 2 | 25 | 1 | | 12 | 2 | 11 |

The invention claimed is:

1. A heat-conductive silicone composition comprising the following components (A) to (D):
    (A) 100 parts by weight of an organopolysiloxane containing at least two alkenyl groups per molecule and having a kinematic viscosity of 10 to 100,000 mm²/s at 25° C.,
    (B) an organohydrogenpolysiloxane containing at least two silicon-bonded hydrogen atoms (i.e., Si—H groups) per molecule and free of molecular end Si—H groups, in such an amount that the number of Si—H groups in component (B) divided by the number of alkenyl groups in component (A) falls in the range from 1.5 to 2.5,
    (C) a platinum complex curing catalyst selected from the group consisting of trimethyl(acetylacetonato)platinum complex, trimethyl(2,4-pentanedionato)platinum complex, trimethyl(3,5-heptanedionato)platinum complex, trimethyl(methylacetoacetato)platinum complex, bis(2,4-pentanedionato)platinum complex, bis(2,4-hexanedionato)platinum complex, bis(2,4-heptanedionato)platinum complex, bis(3,5-heptanedionato)platinum complex, bis(1-phenyl-1,3-butanedionato)platinum complex, bis(1,3-diphenyl-1,3-propanedionato)platinum complex, (1,5-cyclooctadienyl)dimethyl platinum complex, (1,5-cyclooctadienyl)diphenyl platinum complex, (1,5-cyclooctadienyl)dipropyl platinum complex, (2,5-norbornadiene)dimethyl platinum complex, (2,5-norbornadiene)diphenyl platinum complex, (cyclopentadienyl)dimethyl platinum complex, (methylcyclopentadienyl)diethyl platinum complex, (trimethylsilylcyclopentadienyl)diphenyl platinum complex, (methylcycloocta-1,5-dienyl)diethyl platinum complex, (cyclopentadienyl)trimethyl platinum complex, (cyclopentadienyl)ethyldimethyl platinum complex, (cyclopentadienyl)acetyldimethyl platinum complex, (methylcyclopentadienyl)trimethyl platinum complex, (methylcyclopentadienyl)trihexyl platinum complex, (trimethylsilylcyclopentadienyl)trimethyl platinum complex, (dimethylphenylsilylcyclopentadienyl)triphenyl platinum complex, and (cyclopentadienyl)dimethyltrimethylsilylmethyl platinum complex, in such an amount as to give 500 to 10,000 ppm of platinum atom based on the weight of component (A), and
    (D) 500 to 3,000 parts by weight of silver powder.

2. The heat-conductive silicone composition of claim 1, further comprising (E) a heat-conductive filler having a thermal conductivity of at least 10 W/m° C. other than component (D), in an amount of 1 to 300 parts by weight per 100 parts by weight of component (A).

3. The heat-conductive silicone composition of claim 1, further comprising (F) an inhibitor selected from acetylene compounds, nitrogen compounds, organic phosphorus compounds, oxime compounds, and organic chlorine compounds, in an amount of 0.05 to 0.5 part by weight per 100 parts by weight of component (A).

4. The heat-conductive silicone composition of claim 1, further comprising (G) an organosilane having the general formula (1):

$$R^1_a R^2_b Si(OR^3)_{4-a-b} \quad (1)$$

wherein $R^1$ is a $C_9$-$C_{15}$ alkyl group, $R^2$ is a $C_1$-$C_{10}$ monovalent hydrocarbon group, $R^3$ is at least one $C_1$-$C_6$ alkyl group, a is an integer of 1 to 3, b is 0, 1 or 2, and a+b is an integer of 1 to 3, in an amount of 1 to 10 parts by weight per 100 parts by weight of component (A).

5. The heat-conductive silicone composition of claim 1, further comprising (H) a one end trifunctional hydrolyzable methylpolysiloxane having the general formula (2):

[Chem. 1]

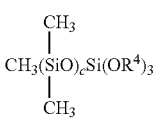

(2)

wherein $R^4$ is a $C_1$-$C_6$ alkyl group and c is an integer of 5 to 100, in an amount of 1 to 10 parts by weight per 100 parts by weight of component (A).

\* \* \* \* \*